United States Patent
Jeon et al.

(10) Patent No.: US 10,203,818 B2
(45) Date of Patent: Feb. 12, 2019

(54) TOUCH SCREEN PANEL INCLUDING AT LEAST ONE DUMMY PATTERN

(71) Applicant: Samsung Display Co., Ltd., Yongin (KR)

(72) Inventors: Byeong-Kyu Jeon, Yongin (KR);
Hee-Woong Park, Yongin (KR);
Kang-Won Lee, Yongin (KR);
Jeong-Heon Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 182 days.

(21) Appl. No.: 14/832,621

(22) Filed: Aug. 21, 2015

(65) Prior Publication Data
US 2016/0139728 A1 May 19, 2016

(30) Foreign Application Priority Data
Nov. 13, 2014 (KR) .................. 10-2014-0158256

(51) Int. Cl.
*G06F 3/044* (2006.01)

(52) U.S. Cl.
CPC .... *G06F 3/044* (2013.01); *G06F 2203/04111* (2013.01); *G06F 2203/04112* (2013.01)

(58) Field of Classification Search
CPC ...... G06F 3/041; G06F 3/0412; G06F 3/0416; G06F 3/044; G06F 2203/04111–2203/04113; G02F 1/13338; G02F 1/1352
See application file for complete search history.

(56) References Cited

U.S. PATENT DOCUMENTS

| | | | |
|---|---|---|---|
| 2009/0213090 A1* | 8/2009 | Mamba | G06F 3/044 345/174 |
| 2010/0007621 A1* | 1/2010 | Kang | G06F 3/044 345/173 |
| 2012/0019473 A1* | 1/2012 | Edwards | G06F 3/044 345/174 |
| 2012/0062511 A1* | 3/2012 | Ishizaki | G06F 3/0412 345/174 |
| 2012/0147467 A1 | 6/2012 | Park | |
| 2013/0038542 A1 | 2/2013 | Kim | |
| 2013/0140061 A1 | 6/2013 | Lim et al. | |
| 2013/0194205 A1 | 8/2013 | Park et al. | |

(Continued)

FOREIGN PATENT DOCUMENTS

| KR | 10-2012-0065686 | 6/2012 |
|---|---|---|
| KR | 10-2012-0131874 | 12/2012 |

(Continued)

*Primary Examiner* — Nathan Danielsen
(74) *Attorney, Agent, or Firm* — H.C. Park & Associates, PLC

(57) ABSTRACT

A touch screen panel includes a substrate, sensing electrodes, outer wirings, contact units, and at least one dummy pattern. The substrate includes an active region and a non-active region, the non-active region disposed outside the active region. The sensing electrodes are disposed in the active region. The outer wirings are disposed in the non-active region. Each of the outer wirings is connected to a respective group of the sensing electrodes. The contact units connect the respective groups of sensing electrodes to the outer wirings. The at least one dummy pattern is disposed between adjacent contact units of the contact units.

18 Claims, 5 Drawing Sheets

(56) References Cited

U.S. PATENT DOCUMENTS

| | | | |
|---|---|---|---|
| 2013/0300706 A1* | 11/2013 | Tun | G06F 3/0412 345/174 |
| 2014/0028939 A1* | 1/2014 | Nakano | G06F 3/0412 349/42 |
| 2014/0152916 A1* | 6/2014 | Nakamura | G06F 3/044 349/12 |
| 2014/0368755 A1* | 12/2014 | Chen | G06F 3/044 349/12 |

FOREIGN PATENT DOCUMENTS

| KR | 10-2013-0017745 | 2/2013 |
|---|---|---|
| KR | 10-2013-0087746 | 8/2013 |

\* cited by examiner

TOUCH SCREEN PANEL INCLUDING AT LEAST ONE DUMMY PATTERN

CROSS-REFERENCE TO RELATED APPLICATION

This application claims priority from and the benefit of Korean Patent Application No. 10-2014-0158256, filed on Nov. 13, 2014, which is incorporated by reference for all purposes as if fully set forth herein.

BACKGROUND

Field

Exemplary embodiments relate to a touch screen panel.

Discussion of the Background

Touch screen panels may be utilized as input devices configured to detect user commands when touched (or almost touched) by an appendage of a user, e.g., a finger, etc., or an object, such as a stylus. When a touch screen panel is utilized in conjunction with a display device, the user may select executable content displayed via a screen of the display device by touching (or hovering over) a portion of the touch screen panel disposed in association with the executable content. In this manner, a touch screen panel may be utilized as a substitute for (or in addition to) one or more conventional input devices, such as buttons, keyboards, mice, trackballs, etc. As such, touch screen panels increase the ease of user interaction.

Conventional touch screen panels may be categorized into various types, such as resistive film touch screen panels, light detection touch screen panels, capacitive touch screen panels, etc. In this manner, each type may detect user interaction according to a different methodology. For instance, a capacitive touch screen panel may include sensing electrodes arranged in an active region of the touch screen panel, and may be configured to detect touching or almost touching (e.g., hovering) interactions. That is, a position of interaction may be detected based on a change in capacitance formed between the sensing electrodes when, for instance, a human finger or an object touches (or almost touches) the touch screen panel. It is noted that conventional capacitive touch screen panels may also include outer wirings disposed in a non-active region disposed outside the active region. The outer wirings may be configured to transmit electrical signals from the sensing electrodes to a driving circuit, such as an external driving circuit. Typically, the outer wirings are formed of a relatively low resistance metal.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel.

Additional aspects will be set forth in the detailed description which follows, and, in part, will be apparent from the disclosure, or may be learned by practice of the inventive concept.

According to one or more exemplary embodiments, a touch screen panel includes a substrate, sensing electrodes, outer wirings, contact units, and at least one dummy pattern. The substrate includes an active region and a non-active region, the non-active region disposed outside the active region. The sensing electrodes are disposed in the active region. The outer wirings are disposed in the non-active region. Each of the outer wirings is connected to a respective group of the sensing electrodes. The contact units connect the respective groups of sensing electrodes to the outer wirings. The at least one dummy pattern is disposed between adjacent contact units of the contact units.

According to one or more exemplary embodiments, a touch screen panel includes a first region, a second region, a first contact pattern, a second contact pattern, and a dummy electrode. The first region is configured to detect interaction with the touch screen. The first region includes: a first group of sensing electrodes substantially aligned in a first direction; and a second group of sensing electrodes substantially aligned in the first direction, the second group of sensing electrodes being spaced apart from the first group of sensing electrodes. The second region is disposed outside the first region. The second region includes: a first wiring electrically connected to the first group of sensing electrodes; and a second wiring electrically connected to the second group of sensing electrodes. The first contact pattern is disposed between and electrically connects the first wiring and the first group of sensing electrodes. The second contact pattern is disposed between and electrically connects the second wiring and the second group of sensing electrodes. The dummy electrode is disposed between the first contact pattern and the second contact pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
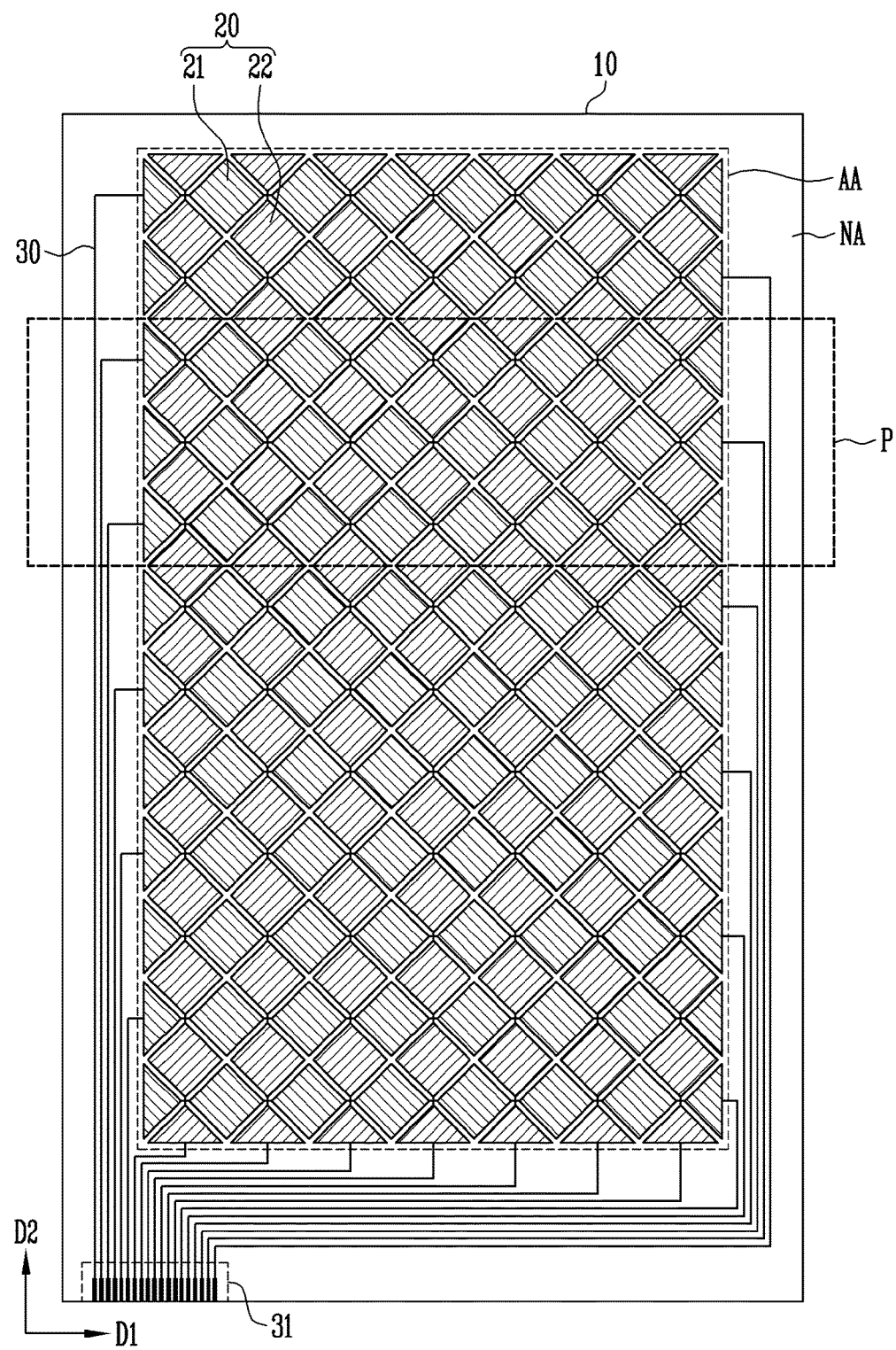
FIG. 1 is a plan view schematically illustrating a touch screen panel, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a plan view schematically illustrating a touch screen panel, according to one or more exemplary embodiments.

Referring to FIG. 1, the touch screen panel may include a substrate 10, sensing electrodes 20, and outer wirings 30. Although specific reference will be made to this particular implementation, it is also contemplated that the touch screen panel may embody many forms and include multiple and/or alternative components.

According to exemplary embodiments, the substrate 10 may be formed of any suitable material, such as, for example, a transparent material with relatively high heat resistance and a chemical resistance. The substrate 10 may be a flexible substrate, or, in other words, the substrate 10 may enable bending, folding, rolling, etc., interactions without plastic deformation or catastrophic failure. For instance, the substrate 10 may be a thin layer type film substrate formed of one or more materials selected from a group consisting of polyethylene terephthalate (PET), polycarbonate (PC), an acryl, polymethyl methacrylate (PMMA), triacetyl cellulose (TAC), polyether sulfone (PES), and a polyimide (PI). It is contemplated, however, that any other suitable material(s) may be utilized in association with exemplary embodiments described herein.

As seen in FIG. 1, the substrate 10 may be divided into an active region AA and a non-active region NA disposed outside (e.g., around) the action region AA. Touch (or near touch) inputs may be detected in the active region AA, but either not detected or ignored in the non-active region NA. When the touch screen panel is integrated with a display, the active region AA may overlap an image display region of a display device, which may be coupled to the touch screen panel. In this manner, the presentation of the display device may be visible to the user even when the touch screen panel is disposed between the user and the display device, as will become more apparent below. It is noted that the non-active region NA may overlap a non-display region of the display device, and, thus, may be invisible, covered, or otherwise non-discernible to the user. For instance, a frame covering the non-display region or a light shielding layer configured to block light may cover the non-active region NA of the touch screen panel.

The sensing electrodes 20 may be distributed in the active region AA of the substrate 10. The sensing electrodes 20 may include a plurality of first sensing electrodes 21 electrically connected in a first direction D1, and a plurality of second sensing electrodes 22 disposed between the first sensing electrodes 21 and electrically connected in a second direction D2 intersecting the first direction D1. It is noted that the second sensing electrodes 22 may not overlap the first sensing electrodes 21.

According to one or more exemplary embodiments, the first sensing electrodes 21 and the second sensing electrodes 22 are alternately disposed and connected in different directions from one another. For example, the first sensing electrodes 21 may be formed to connect in a row direction (e.g., a horizontal direction D1). To this end, each row of first sensing electrodes 21 and may be respectively connected to a corresponding outer wiring 30, e.g., first sensing electrodes 22 may be connected to outer wirings 30 in units of row lines. Further, the second sensing electrodes 22 may be formed to connect in a column direction (e.g., a vertical direction D2). In this manner, each column of second sensing electrodes 22 may be respectively connected to corresponding outer wirings 30, e.g., second sensing electrodes 22 may be connected to outer wirings 30 in units of column lines.

The sensing electrodes 20 may be formed of any suitable material, such as, for instance, a transparent electrode material, e.g., such as aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline (PANI), poly(3,4-ethylenedioxythiophene) poly (styrenesulfonate) (PEDOT:PSS), etc. In this manner, the sensing electrodes 20 may be configured to transmit light propagating from a display unit disposed on a lower portion of the touch screen panel.

Although FIG. 1 illustrates each pattern of the sensing electrodes 20 having a diamond shape, exemplary embodiments are not limited thereto. As such, any suitable shape, material quality, and structure of the sensing electrodes 20 may be utilized in association with exemplary embodiments described herein. For example, the sensing electrodes 20 may be formed of a mesh pattern made of a relatively low resistance material (e.g., a relatively low resistance metal material), which may not be a transparent electrode material, however, may enable light to propagate therethrough due to the mesh pattern. It is also contemplated that the first and second sensing electrodes 21 and 22 may be formed on different surfaces with the substrate 10 disposed therebetween.

According to one or more exemplary embodiments, the outer wirings 30 connect the first sensing electrodes 21 and the second sensing electrodes 22 in units of lines in the first direction D1 and the second direction D2, respectively, to a driving circuit (not shown), such as an external driving circuit. For example, the outer wirings 30 may be electrically connected to the first sensing electrodes 21 and second sensing electrodes 22 in units of row lines and units of column lines, respectively. In this manner, the first sensing electrodes 21 and the second sensing electrodes 22 may be connected to a driving circuit, such as a position sensing circuit, through a pad unit 31.

The outer wirings 30 are configured to avoid the active region AA and, thereby, disposed in the non-active region NA of the touch screen panel. In addition, the outer wirings 30 may be formed from a wide range of materials other than a transparent electrode material, as well as formed of a relatively low resistance metal, such as, for instance, molybdenum (Mo), silver (Ag), titanium (Ti), copper (Cu), aluminum (Al), etc., and/or combinations thereof, e.g., molybdenum/aluminum/molybdenum (Mo/Al/Mo), etc.

According to one or more exemplary embodiments, the touch screen panel may detect touch (or near touch) interactions utilizing a capacitive method. Namely, when a touching object, such as a human finger, a stylus pen, etc., touches (or nearly touches) the touch screen panel, a change in capacitance with respect to a position of interaction may be transmitted from the sensing electrodes 20 to the driving circuit via the outer wirings 30 and the pad unit 31. As such, the position of interaction may be determined by an electrical signal generated from X and Y input process circuits (not shown), which may convert the change in the capacitance into the electrical signal corresponding to the position of the interaction.

Figure 2:
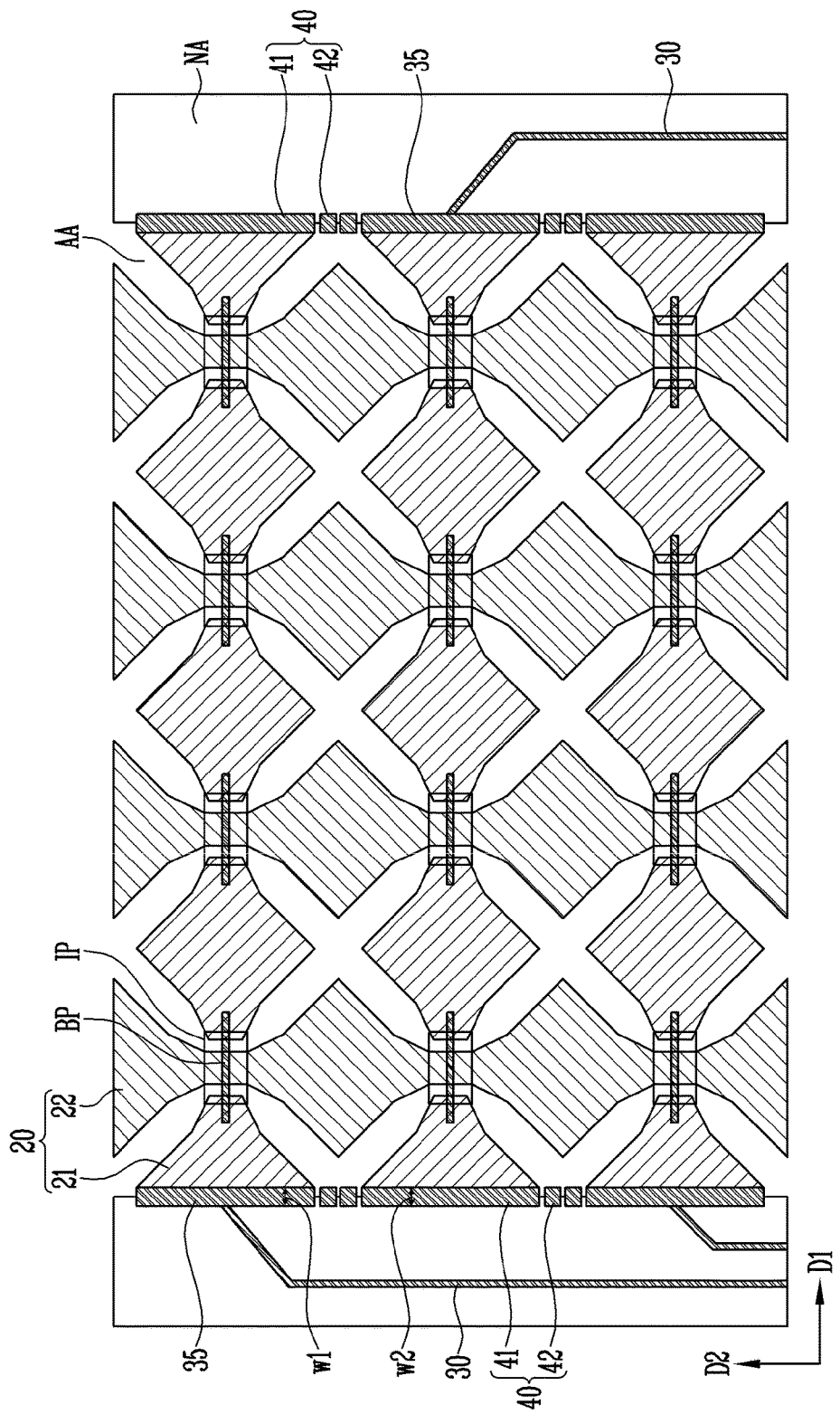
FIG. 2 is an enlarged view of region P of the touch screen panel of FIG. 1, according to one or more exemplary embodiments.
Figure 3:
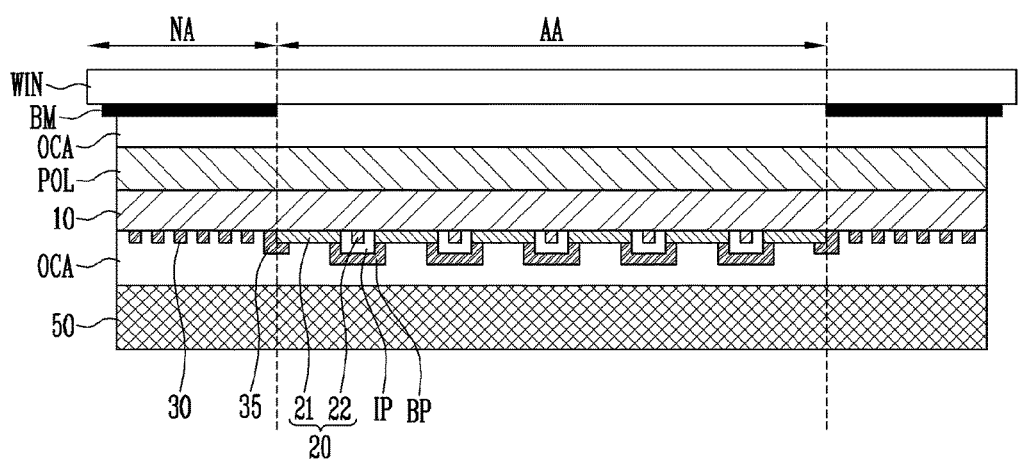
FIG. 3 is a cross-sectional view of the touch screen panel of FIG. 2, according to one or more exemplary embodiments.

FIG. 2 is an enlarged view of a region P of the touch screen panel of FIG. 1, according to one or more exemplary embodiments. FIG. 3 is a cross-sectional view of the touch screen panel of FIG. 2.

Referring to FIGS. 2 and 3, the touch screen panel may include contact units 35 electrically connecting the sensing electrodes 20 and the outer wirings 30 and at least one dummy pattern 40 located between adjacent contact units 35. For instance, the contact units 35 may be located at a first end of the sensing electrodes, and the dummy patterns 40 may be located at a second end opposite to the first end of the sensing electrodes 20. To this end, the dummy patterns 40 are not connected to the outer wirings 30. For example, the contact units 35 may be located at a left end of the sensing electrodes 20 and the dummy patterns 40 may be located at a right end of the sensing electrodes 20. It is also contemplated, however, that the contact units 35 may be located at the right end of the sensing electrodes 20 and the dummy patterns 40 may be located at the left end of the sensing electrodes 20.

According to one or more exemplary embodiments, the contact units 35 and the dummy patterns 40 may be alternately arranged in the same line. For example, the contact units 35 and the dummy patterns 40 may be arranged in a row along a boundary line between the active region AA and the non-active region NA, such that a plurality of dummy patterns 40 may be located between the contact units 35. Further, the contact units 35 and the dummy patterns 40 may be formed of the same material and with the same width. For example, a first width w1 of the contact unit 35 and a second width w2 of the dummy pattern 40 may be the same in the first direction D1. Lengths of the contact units 35 may be greater than line widths of the outer wirings 30 in the second direction D2. This may reduce contact resistance between the sensing electrodes 20 and the contact units 35. Similar to the outer wirings 30, the contact units 35 and the dummy patterns 40 may be formed of a relatively low resistance material, such as, for instance, a low resistance metal, e.g., molybdenum (Mo), silver (Ag), titanium (Ti), copper (Cu), aluminum (Al), molybdenum/aluminum/molybdenum (Mo/Al/Mo), or the like.

The dummy patterns 40 may include first dummy patterns 41 and second dummy patterns 42 with different sizes. The first dummy patterns 41 may be formed to have the same shape and size as the contact units 35. The first dummy patterns 41 cover spaces where the contact units 35 are not located and function as if the contact units 35 were present in an external view. The second dummy patterns 42 are formed with fine patterns having sizes smaller than the first dummy patterns 41. The first dummy patterns 41 and a plurality of second dummy patterns 42 may be alternately arranged with one another. The plurality of the second dummy patterns 42 are located between the contact units 35 and the first dummy patterns 41 to densely cover spaces and function as if a single pattern existed along an edge of the active region AA in an external view.

According to one or more exemplary embodiments, the first sensing electrode 21 and the second sensing electrode 22 may be formed on (or in) the same layer, and the touch screen panel may include a bridge pattern BP, which electrically connects two adjacent first sensing electrodes 21, and an insulating pattern IP, which ensures insulating properties while being disposed between the second sensing electrode 22 and the bridge pattern BP.

The bridge pattern BP may be formed of the same transparent electrode material as the sensing electrodes 20 or formed of an opaque and relatively low resistance metal. A width, a thickness, a length, and/or the like of the bridge pattern BP may be adjusted to prevent (or otherwise reduce) visibility thereof. It is also contemplated that he bridge pattern BP may be designed to be tilted in a diagonal direction to more effectively prevent (or reduce) visibility thereof. The insulating pattern IP may be partially disposed between the second sensing electrode 22 and the bridge pattern BP, where insulating properties may be utilized to prevent short circuit connections between the second sensing electrode 22 and the bridge pattern BP, which may connect adjacent first sensing electrodes 21 to one another. Further, the insulating pattern IP may be entirely formed on the active region AA where the sensing electrodes 20 are formed in the active region AA.

In one or more exemplary embodiments, the touch screen panel may have a display integrated structure or a window integrated structure. In this manner, the touch screen panel may include a display unit 50. The substrate 10 may have a sensing electrode 20 formed thereon and adhered to a display surface of the display unit 50. The touch screen panel may further include a window substrate WIN facing the substrate 10, a light shielding layer BM formed on the window substrate WIN and configured to overlap the non-active region NA, a polarizing plate POL located on a back side of the substrate 10, and adhesive layers OCA, which may be utilized to adhere the substrate 10 to the display unit 50 and the window substrate WIN to the polarizing plate POL.

Figure 4A:
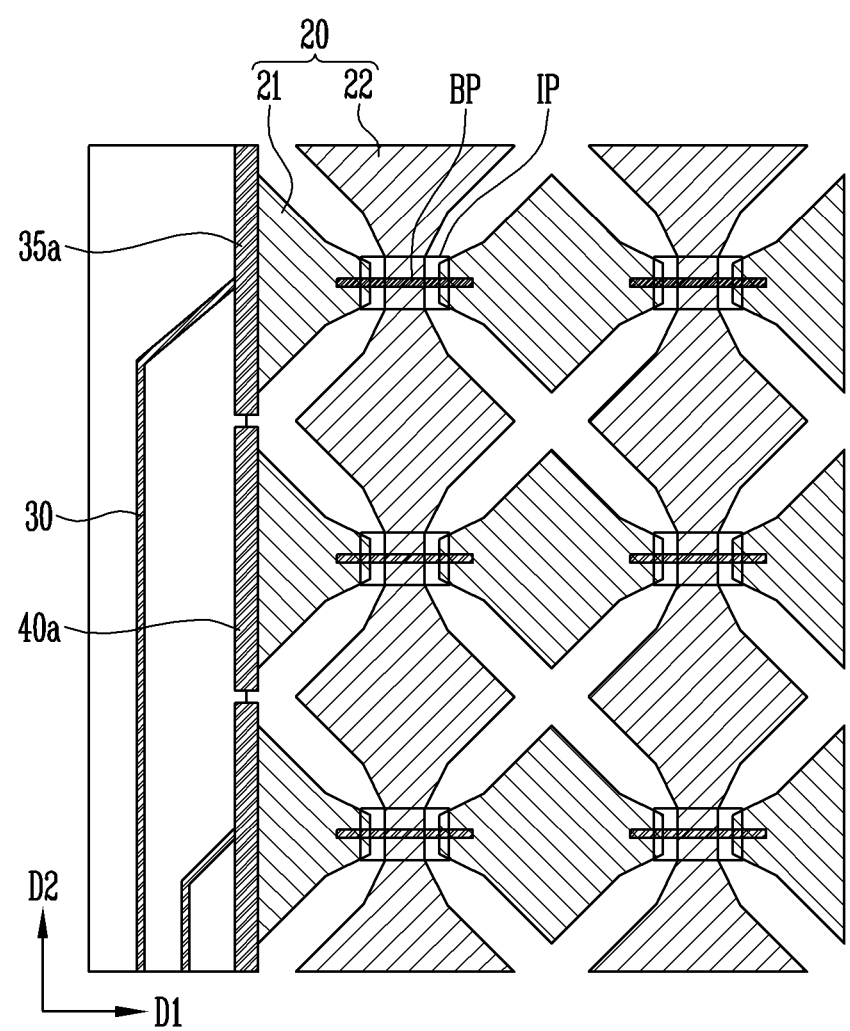
FIGS. 4A and 4B are enlarged views of a portion of a touch screen panel, according to one or more exemplary embodiments.
Figure 4B:
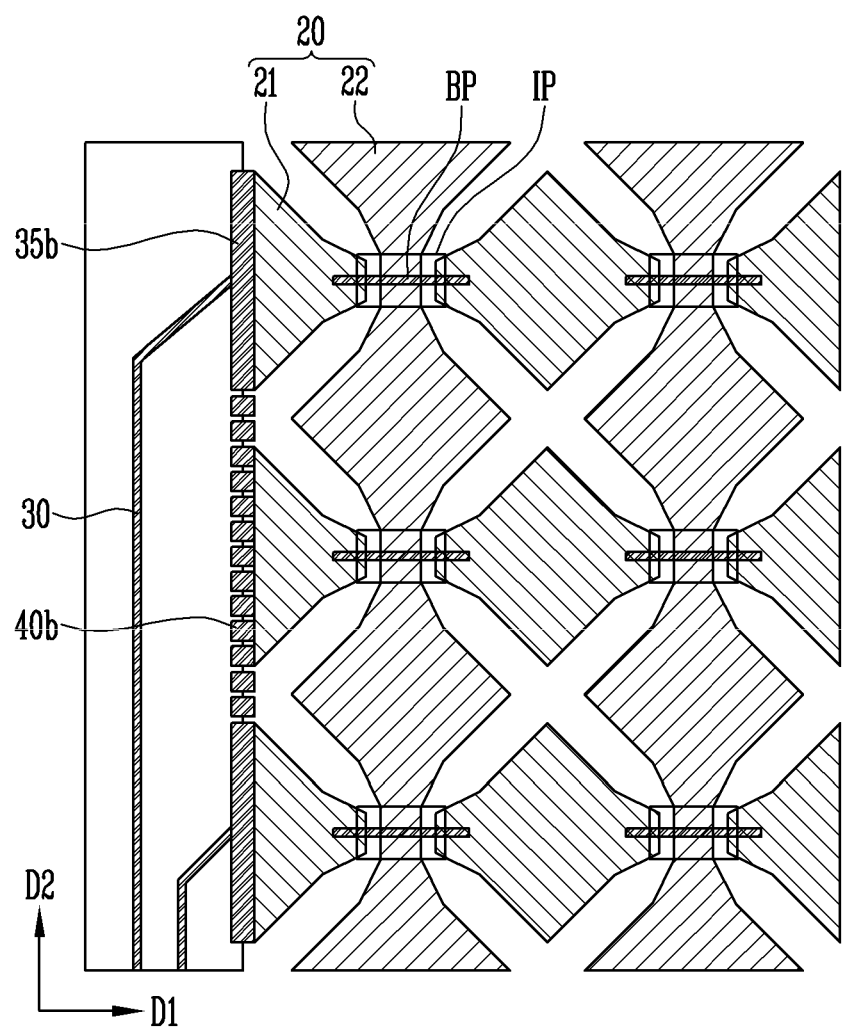

FIGS. 4A and 4B are enlarged views of a portion of a touch screen panel, according to one or more exemplary embodiments. In order to avoid obscuring exemplary embodiments described herein, duplicative descriptions are avoided, such that like numerals refer to like features in the several illustrations.

First, referring to FIG. 4A, the touch screen panel may include contact units 35a and dummy patterns 40a formed to have lengths greater than widths of ends of sensing electrodes 20. That is, a separation distance between the contact units 35a and the dummy patterns 40a, which are decreased to minimize the number of separated patterns in the touch screen panel. In this manner, the segmented contact units 35a may be prevented (or otherwise reduced) from being visually recognized as concavo-convex patterns.

Referring to FIG. 4B, the touch screen panel includes contact units 35b, which may be prevented (or otherwise reduced) from being visualized when a plurality of fine sized dummy patterns 40b are disposed between adjacent contact units 35b. This effect is substantially the same as an effect for covering a gap between contact units 35 using only the second dummy patterns 42 (i.e., not the first dummy patterns 41) as previously described.

It is noted that a conventional touch screen panel may include outer wirings located further inside a non-active touch region due to an opaque visibility of a metal and may suffer from a space limitation caused, at least in part, by an increase in dead space. Further, when the outer wirings are disposed on a lower portion of a polarizing plate, a polarization effect may cause, at least in part, a surface reflecting phenomenon of a metal to disappear and may result in a color of the outer wirings to be viewed as black. This issue may be perceived as adding to the concavo-convex shape of a contact unit electrically connecting the outer wirings to the sensing electrodes.

According to exemplary embodiments, segmented contact units turning into the concavo-convex shape may be prevented (or otherwise reduced) by inducing an effect of continuously extending the contact units while having at least one dummy pattern located between the contact units. Further, since the outer wirings may be disposed more closely to the active region toward an inside of the substrate, an overall width of the non-active region may become smaller. Thus, there is an advantage of forming a narrower bezel.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A touch screen panel, comprising:
   a substrate comprising:
      an active region; and
      a non-active region disposed outside the active region;
   a polarizing layer disposed on a first surface of the substrate;
   sensing electrodes disposed in the active region on a second surface of the substrate opposing the first surface such that the substrate is disposed between the polarizing layer and the sensing electrodes;
   outer wirings disposed in the non-active region, each of the outer wirings being connected to a respective group of the sensing electrodes;
   contact units connecting the respective groups of the sensing electrodes to the outer wirings, each of the contact units overlapping, in a direction normal to the substrate, a portion of a corresponding first sensing electrode of a respective group of the sensing electrodes; and
   a dummy pattern disposed under the polarizing layer and between adjacent contact units of the contact units, the dummy pattern overlapping, in the direction normal to the substrate, a portion of a second sensing electrode of a respective group of the sensing electrodes such that a first portion of the dummy pattern is disposed in the active region and a second portion of the dummy pattern is disposed in the non-active region, the second sensing electrode being different from the corresponding first sensing electrodes,
   wherein the dummy pattern comprises:
      a first dummy pattern; and
      a second dummy pattern spaced apart from the first dummy pattern, sizes of the first dummy pattern and the second dummy pattern being different from one another.

2. The touch screen panel of claim 1, wherein:
   some of the contact units are disposed at a first side of the active region;
   the dummy pattern is disposed at a second side of the active region, the second side opposing the first side; and
   the dummy pattern is not directly connected to the outer wirings.

3. The touch screen panel of claim 2, wherein the adjacent contact units and the dummy pattern are arranged along a same line.

4. The touch screen panel of claim 3, wherein the adjacent contact units and the dummy pattern are arranged in an alternating pattern.

5. The touch screen panel of claim 4, wherein:
   the contact units and the dummy pattern are formed of a same material; and
   widths of the contact units and the first dummy pattern are the same.

6. The touch screen panel of claim 1, wherein lengths of the contact units are greater than line widths of the outer wirings.

7. The touch screen panel of claim 1, wherein sizes and shapes of the first dummy pattern and the contact units are the same.

8. The touch screen panel of claim 1, wherein the sensing electrodes comprise:
   a first group of the respective groups of the sensing electrodes, the first group longitudinally extending in a first direction; and
   a second group of the respective groups of the sensing electrodes, the second group longitudinally extending in a second direction intersecting the first direction.

9. The touch screen panel of claim 8, further comprising:
   a bridge pattern connecting adjacent sensing electrodes of the first group to one another.

10. The touch screen panel of claim 1, further comprising:
    a window substrate facing the substrate.

11. The touch screen panel of claim 10, further comprising:
    a light shielding layer disposed between the window substrate and the polarizing layer, the light shielding layer overlapping the non-active region.

12. The touch screen panel of claim 10, wherein the polarizing layer is disposed between the window substrate and the substrate.

13. The touch screen panel of claim 1, wherein the sensing electrodes of the respective group of the sensing electrodes are aligned with one another along a same line.

14. A touch screen panel, comprising:
    a substrate comprising:
      an active region; and
      a non-active region disposed outside the active region;
    sensing electrodes disposed in the active region;
    outer wirings disposed in the non-active region, each of the outer wirings being connected to a respective group of the sensing electrodes;
    contact units connecting the respective groups of the sensing electrodes to the outer wirings; and
    a dummy pattern disposed between adjacent contact units of the contact units,
    wherein the dummy pattern comprises:
      a first dummy pattern; and
      a second dummy pattern spaced apart from the first dummy pattern, the second dummy pattern being smaller than the first dummy pattern, and
    wherein the second dummy pattern is disposed between a first contact unit of the contact units and the first dummy pattern.

15. The touch screen panel of claim 14, wherein:
    the second dummy pattern is one of a plurality of second dummy patterns; and
    the first dummy pattern is alternately arranged with the plurality of second dummy patterns.

16. A touch screen panel, comprising:
    a first region configured to detect interaction with the touch screen, the first region comprising:
      a first group of sensing electrodes substantially aligned in a first direction,
      a second group of sensing electrodes substantially aligned in the first direction, the second group of sensing electrodes being spaced apart from the first group of sensing electrodes, and
      a third group of sensing electrodes substantially aligned in the first direction, the third group of sensing electrodes being spaced apart from the first group of sensing electrodes and the second group of sensing electrodes;
    a second region disposed outside the first region, the second region comprising:
      a first wiring electrically connected to the first group of sensing electrodes,
      a second wiring electrically connected to the second group of sensing electrodes, and
      a third wiring electrically connected to the third group of sensing electrodes;
    a polarizing layer disposed in the first region and the second region;
    a first contact pattern disposed between and electrically connecting the first wiring and the first group of sensing electrodes;
    a second contact pattern disposed between and electrically connecting the second wiring and the second group of sensing electrodes;
    a third contact pattern disposed between and electrically connecting the third wiring and the third group of sensing electrodes;
    a dummy electrode disposed under the polarizing layer and between the first contact pattern and the second contact pattern, the dummy electrode overlapping, in a direction normal to a plane comprising the first direction, a portion of a sensing electrode in the third group of sensing electrodes such that a first portion of the dummy electrode is disposed in the first region and a second portion of the dummy electrode is disposed in the second region;
    a second dummy electrode disposed between the dummy electrode and the first contact pattern; and
    a third dummy electrode disposed between the dummy electrode and the second contact pattern.

17. The touch screen panel of claim 16, wherein the dummy electrode is substantially aligned with the first contact pattern and the second contact pattern in a second direction crossing the first direction.

18. The touch screen panel of claim 16, wherein the dummy electrode, the second dummy electrode, and the third dummy electrode are substantially aligned in a second direction crossing the first direction.

* * * * *